US010001905B2

(12) United States Patent
Jeong et al.

(10) Patent No.: US 10,001,905 B2
(45) Date of Patent: Jun. 19, 2018

(54) METHOD FOR EXECUTING MENU IN MOBILE TERMINAL AND MOBILE TERMINAL USING THE SAME

(71) Applicant: LG ELECTRONICS INC., Seoul (KR)

(72) Inventors: Ji Won Jeong, Seoul (KR); So Hoon Yi, Seoul (KR); Eun Jeong Ryu, Seoul (KR); Ha Rim Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 14/951,233

(22) Filed: Nov. 24, 2015

(65) Prior Publication Data
US 2016/0147389 A1 May 26, 2016

Related U.S. Application Data

(63) Continuation of application No. 12/819,132, filed on Jun. 18, 2010, now abandoned.

(30) Foreign Application Priority Data

Aug. 3, 2009 (KR) ........................ 10-2009-0071147

(51) Int. Cl.
*G06F 17/30* (2006.01)
*G06F 7/00* (2006.01)
(Continued)

(52) U.S. Cl.
CPC .......... *G06F 3/0482* (2013.01); *G06F 3/0486* (2013.01); *G06F 3/0488* (2013.01);
(Continued)

(58) Field of Classification Search
CPC . G06F 17/30861; G06F 17/276; G06F 3/0482
(Continued)

(56) References Cited

U.S. PATENT DOCUMENTS

2006/0212790 A1* 9/2006 Perantatos ............ G06F 3/0486
715/234
2007/0083408 A1* 4/2007 Altberg .................. G06Q 30/02
705/14.69

(Continued)

FOREIGN PATENT DOCUMENTS

KR     10-2007-0045900       5/2007

OTHER PUBLICATIONS

Korean Intellectual Property Office Application Serial No. 10-2009-0071147, Office Action dated Oct. 22, 2015, 5 pages.
(Continued)

*Primary Examiner* — Kuen S Lu
(74) *Attorney, Agent, or Firm* — Lee, Hong, Degerman, Kang & Waimey

(57) ABSTRACT

The present disclosure is related to a method for executing a menu in a mobile terminal, the method including displaying a data in a display unit of the mobile terminal; selecting at least a portion of the data which is displayed on the display unit through a user input unit; searching whether a data included in a first category data exists in the selected portion of the data; and setting up a first category execution item which is related to the first category data, if the first category data is searched in the selected portion of the data, and a mobile terminal using the same.

20 Claims, 23 Drawing Sheets

(51) Int. Cl.
    *G06F 3/0482* (2013.01)
    *H04M 1/725* (2006.01)
    *G06F 3/0484* (2013.01)
    *G06F 3/0486* (2013.01)
    *G06F 3/0488* (2013.01)

(52) U.S. Cl.
    CPC .... *G06F 3/04842* (2013.01); *H04M 1/72522* (2013.01); *H04M 1/72561* (2013.01); *H04M 1/72569* (2013.01); *H04M 1/72583* (2013.01)

(58) Field of Classification Search
    USPC .......................................... 707/758; 715/835
    See application file for complete search history.

(56) References Cited

U.S. PATENT DOCUMENTS

| | | | | |
|---|---|---|---|---|
| 2008/0133599 | A1* | 6/2008 | Stewart | G06F 17/30241 |
| 2008/0134030 | A1* | 6/2008 | Kansal | G06F 3/0481 |
| | | | | 715/700 |
| 2008/0282164 | A1* | 11/2008 | Blass | G06F 17/30861 |
| | | | | 715/719 |
| 2008/0301581 | A1* | 12/2008 | Baek | G06F 17/276 |
| | | | | 715/810 |
| 2008/0320107 | A1* | 12/2008 | Park | H04L 67/04 |
| | | | | 709/219 |
| 2008/0320419 | A1* | 12/2008 | Matas | G01C 21/20 |
| | | | | 715/863 |
| 2010/0058216 | A1* | 3/2010 | Yoon | G06F 3/0482 |
| | | | | 715/769 |
| 2010/0262928 | A1 | 10/2010 | Abbott | |

OTHER PUBLICATIONS

United States Patent and Trademark Office U.S. Appl. No. 12/819,132, Office Action dated Nov. 8, 2016, 14 pages.

* cited by examiner

METHOD FOR EXECUTING MENU IN MOBILE TERMINAL AND MOBILE TERMINAL USING THE SAME

CROSS-REFERENCES TO RELATED APPLICATIONS

This application is a continuation of U.S. patent application Ser. No. 12/819,132, filed on Jun. 18, 2010, now abandoned, which claims the benefit of earlier filing date and right of priority to Korean Patent Application No. 10-2009-0071147, filed on Aug. 3, 2009, the contents of which are all hereby incorporated by reference herein in their entirety.

BACKGROUND OF THE DISCLOSURE

Field

The present disclosure relates to a method for executing a menu in a mobile terminal for providing a convenient input manner and a mobile terminal using the same.

Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To support and increase the terminal functions, the improvement of structural parts and/or software parts of the terminal may be considered.

Recently, as the mobile terminal comes to be able to process the multi-task, the input manner which enables the user to execute a function while executing other function has been studied.

SUMMARY

Accordingly, an object of the present disclosure is to provide a method for executing a menu in a mobile terminal, the method comprising: displaying a data in a display unit of the mobile terminal; selecting at least a portion of the data which is displayed on the display unit through a user input unit; and searching whether a data included in a first category data exists in the selected portion of the data; and setting up a first category execution item which is related to the first category data, if the first category data is searched in the selected portion of the data.

In some exemplary embodiments, the first category data is a data having a predetermined character string.

In some exemplary embodiments, the method for executing a menu further comprises placing a cursor block on the first category data.

In some exemplary embodiments, the method for executing a menu further comprises automatically selecting the first category data in response to a first category data selection signal of the user.

In some exemplary embodiments, the step of placing a cursor on the first category data comprises displaying by changing the color of the cursor block.

In some exemplary embodiments, the method for executing a menu further comprises automatically using the first category data in executing a first executing item if the first category executing item is selected.

In some exemplary embodiments, the specific data is any one of a web data, an e-book data, an image data, and a text data.

Moreover, another object of the present disclosure is to provide a method for executing a menu in a mobile terminal, the method comprising: displaying a data in a display unit of the mobile terminal; selecting at least a portion of the data which is displayed on the display unit; searching whether a first category data included in a first category exists in the selected portion of the data and whether a second category data included in a second category exists in the selected portion of the data; and setting up a second category execution item which is related to the first category data and the second category data, if the first category data and the second category are searched in the selected portion of the data.

In some exemplary embodiments, the first category data is a phone number data, the second category data is an image data, and the second category executing item is a multimedia text message menu.

In some exemplary embodiments, the first category data and the second category data are distinguishably displayed, respectively.

In some exemplary embodiments, the user drawing includes a folder drawing and the controller controllably generates the drawn folder if the folder drawing is inputted through the touch screen.

Moreover, another object of the present disclosure is to provide a mobile terminal comprising: a display unit configured to display a data; a user input unit configured to select a portion of the data displayed on the display unit; and a controller configured to search whether a first category data included in a first category exists in a selected portion of the data if the selected portion of the data is selected through the user input unit, and to set up a first category execution item which is related to the first category data, if the first category data is searched in the selected portion of the data.

In some exemplary embodiments, the first category data is a data having a predetermined character string.

In some exemplary embodiments, the controller controls a cursor block to be placed on the first category data.

In some exemplary embodiments, the controller controls the first category data to be automatically selected in response to a first category data selection signal of the user.

In some exemplary embodiments, the controller controls the cursor block to be placed in changed color.

In some exemplary embodiments, the controller controls the first category data to be automatically used in executing a first executing item if the first category executing item is selected.

In some exemplary embodiments, the specific data is any one of a web data, an e-book data, an image data, and a text data.

In some exemplary embodiments, the controller controls the display unit such that the first category data and the second category data can be distinguishably displayed, respectively.

In some exemplary embodiments, the controller controls the display unit such that the first category data and the second category data can be distinguishably displayed by the color, respectively.

In some exemplary embodiments, the controller controls a function to be executed in response to selection of the first category item.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
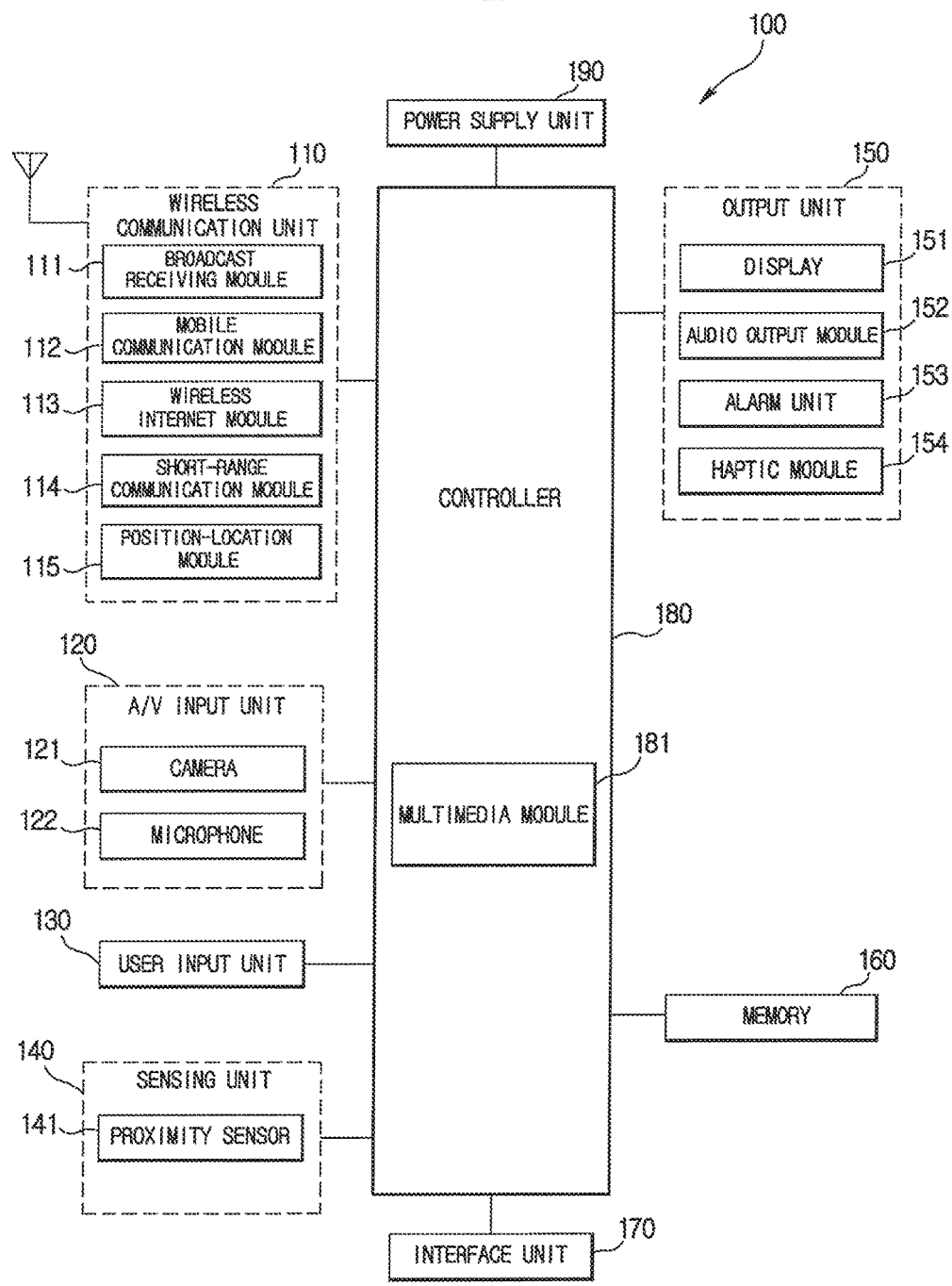
FIG. 1 is a block diagram of a mobile terminal in accordance with an example embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced by a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than that of the contact type sensor and may also have a greater usage than that of the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified as the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
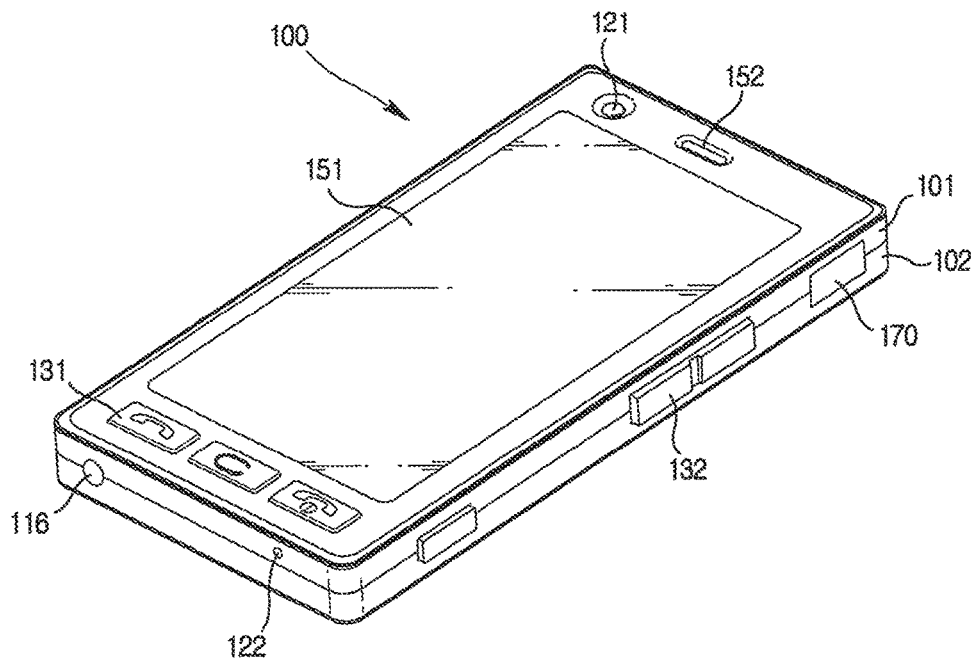
FIG. 2A is a front-view of a mobile terminal according to an example embodiment.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
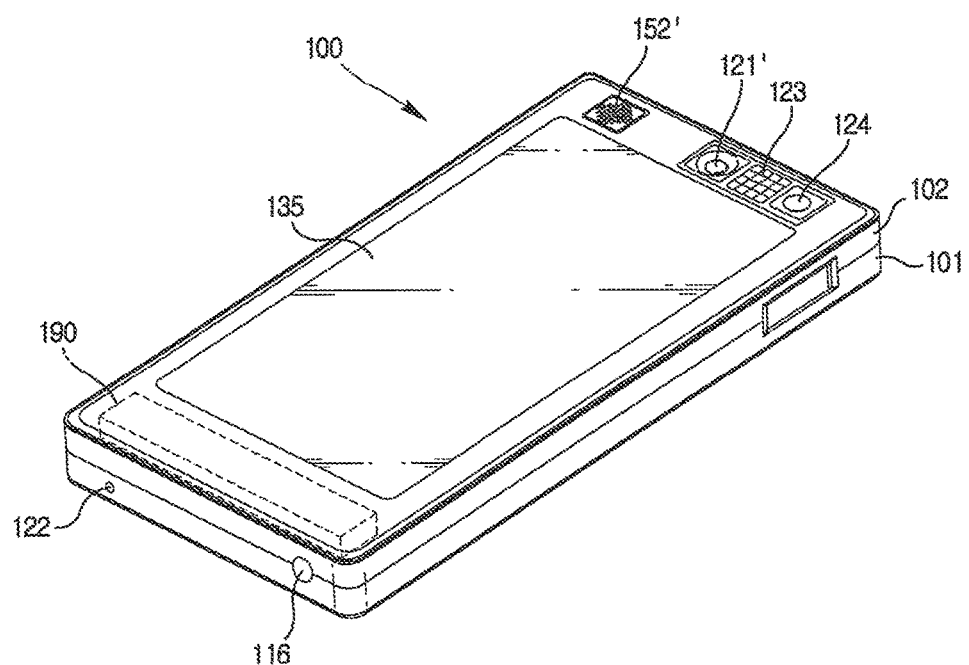
FIG. 2B is a perspective diagram of a backside of the mobile terminal shown in FIG. 2A.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

In the following description, the method for executing a menu according to the present disclosure will be explained, referring to FIG. 3 and FIG. 4.

Figure 3:
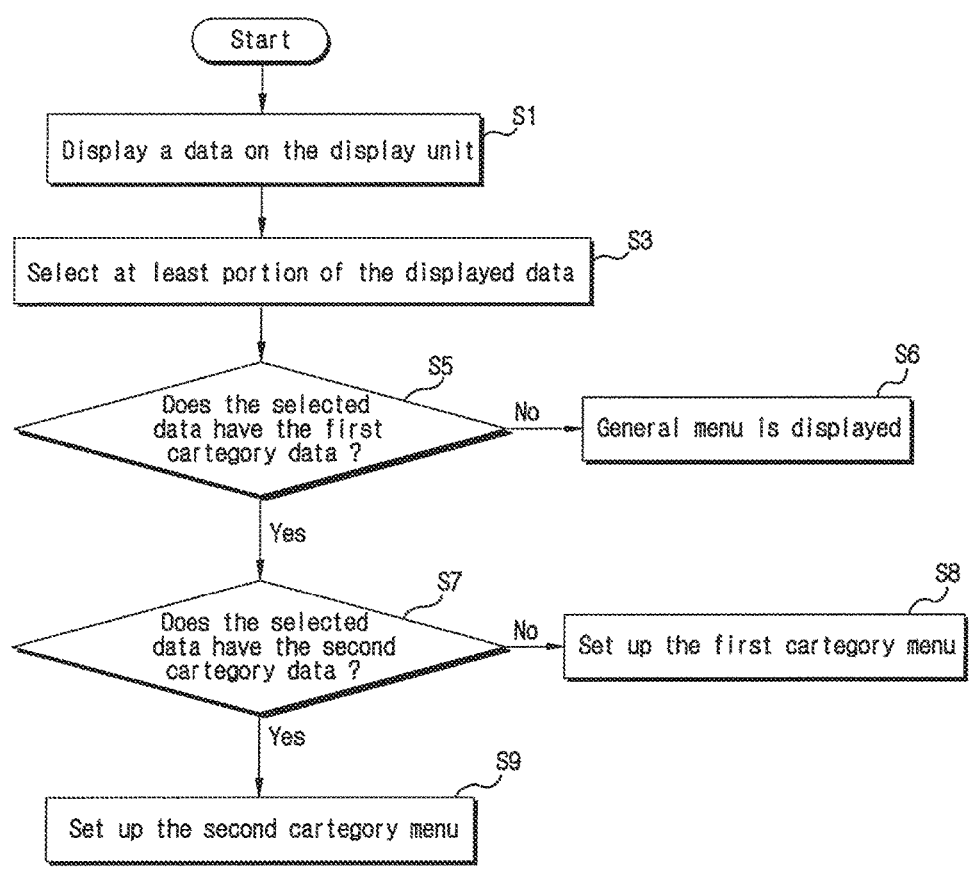
FIG. 3 is a flow chart for explaining the method for executing a menu in a mobile terminal, according to the one embodiment of the present disclosure.
Figure 4:
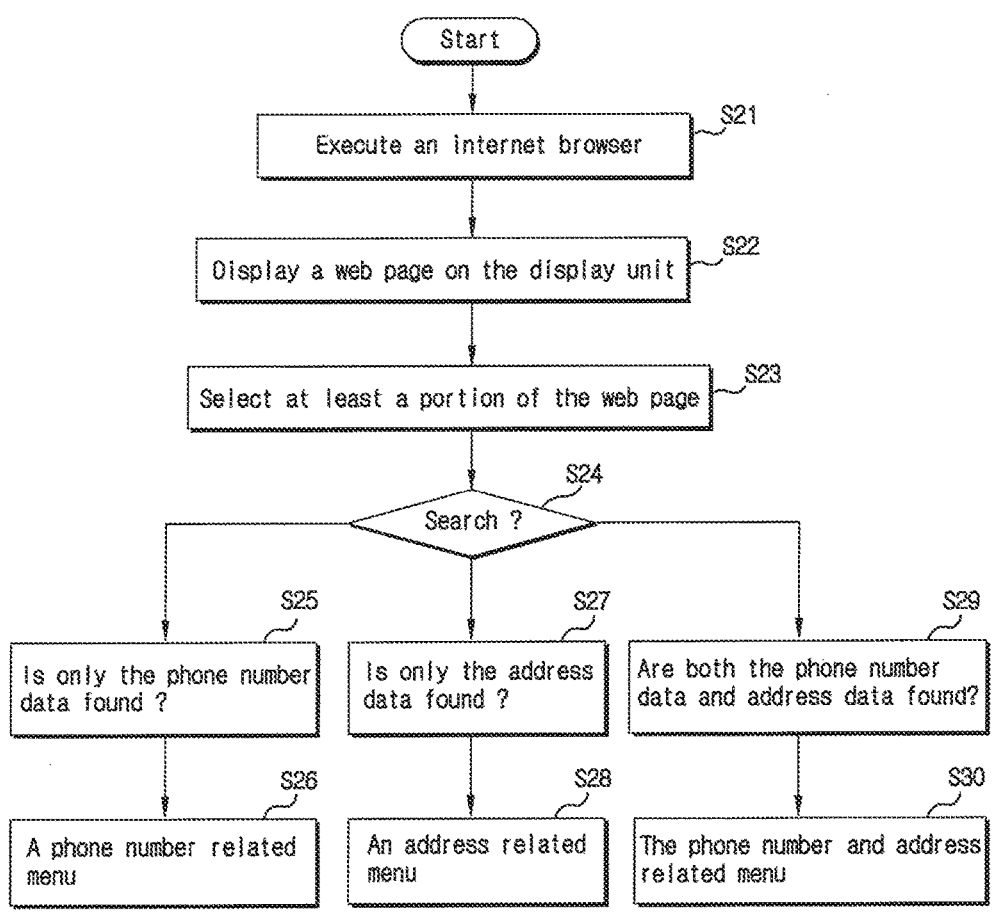
FIG. 4 is a flow chart of an implementation where the method for executing a menu in a mobile terminal is applied on a web page.

FIG. 3 is a flow chart for explaining the method for executing a menu in a mobile terminal, according to the one embodiment of the present disclosure and FIG. 4 is a flow chart of an implementation where the method for executing a menu in a mobile terminal is applied on a web page.

As shown in FIG. 3, at first, a data is displayed on the display unit 151 of the mobile terminal 100 (S1). The data may be a e-book data, an image data, and a file data stored in the memory 160. Or, the data may be a web page data stored in an external server. The user selects at least portion of the displayed data through the user input unit 130 (S3). At this point, if the display unit 151 is a touch screen, the user chooses two points on the touch screen within a predetermined time so as to select an area whose corners come to be the two points. Or, a drag and drop gesture may be used in selecting the portion of the data. If the portion of the data is selected, the controller searches whether the selected data have a first category data. The first category data may be a phone number data, or an address data. If at least 3 continuous number string and a dash (-) between the number string are searched, the data may be determined as the phone number. The postal code data base and the search word data base may be used in determining whether it is the address data or not. Namely, in case of USA, the serial 5 numbers is used in the postal code. Therefore, the controller determines that the 5 serial number is the address data. Or, a frequently used phrase in address such as country, province, city, state, ave., Dr., St. is used in determination for the address data. If the first category data is not searched in the selected data and the input signal for the menu key on the selected data, the general menu, a default menu, is displayed on the display unit 151 (S6). If the first category data exists in the selected data, the controller 180 searches whether the selected data has a second category data (S7). If the selected data does not have the second category data, the first category menu including a first category execution item is set up (S8). Moreover, the cursor may be positioned on the first category data. Furthermore, the first category data is automatically selected to be displayed distinguishable from other data. If the second category data is included in the selected data, the second category menu including a second category execution item is set up. Then, when the input signal on the menu key is generated, the second category menu is displayed on the display unit 151 (S9).

According to the present disclosure, the selected data is analyzed to differently constitute the menu based on the characteristic of the selected data. So, the user may more easily use the menu that he wants.

The controller automatically selects the predetermined category menu so that the user may reduce the number of input.

FIG. 4 is a flow chart of an implementation where the method for executing a menu in a mobile terminal is applied on a web page.

As shown in FIG. 4, at first, the controller executes an internet web browser by the user input signal (S21). Then, a web page is displayed on the display unit 151 (S22). In this state, at least a portion of the web page is selected by the user selection signal (S23). Then, the controller searches the selected web page (S24). If the phone number data is found (S25), a phone related menu is set up. So, if the user selects the menu key in this state, the phone related menu is displayed on the display unit 151 (S26). At this point, a cursor may be automatically positioned on the phone number data, and the phone number data will be changed to have a specific color. Furthermore, the phone number related menu may have the specific color. On the other hand, if an address data exists in the selected web page without phone number data (S27), an address related menu is set up. So, if the user selects the menu key in this state, the address related menu is displayed on the display unit 151 (S28). On the other hand, if both the phone number data and the address data exist in the selected web page data (S29), the controller sets up the phone number and address related menu. Accordingly, if the user selects the menu key in this state, the phone number and address related menu is displayed on the display unit (S30).

In the following description, the implementations where the method for executing a menu is applied will be described, referring to FIG. 5 to FIG. 8.

FIG. 5 is an image diagram of the first implementation where the method for executing a menu in a mobile terminal according to the one embodiment of the present disclosure is applied, FIG. 6 is an image diagram of the second implementation where the method for executing a menu in a mobile terminal according to the one embodiment of the present disclosure is applied, FIG. 7 is an image diagram of the third implementation where the method for executing a menu in a mobile terminal according to the one embodiment of the present disclosure is applied, and FIG. 8 is an image diagram of the fourth implementation where the method for executing a menu in a mobile terminal according to the one embodiment of the present disclosure is applied.

[First Implementation]

FIGS. 5A, 5B, 5C, 5D and 5E are image diagrams of the first implementation where the method for executing a menu in a mobile terminal according to the one embodiment of the present disclosure is applied.

Figure 5A:
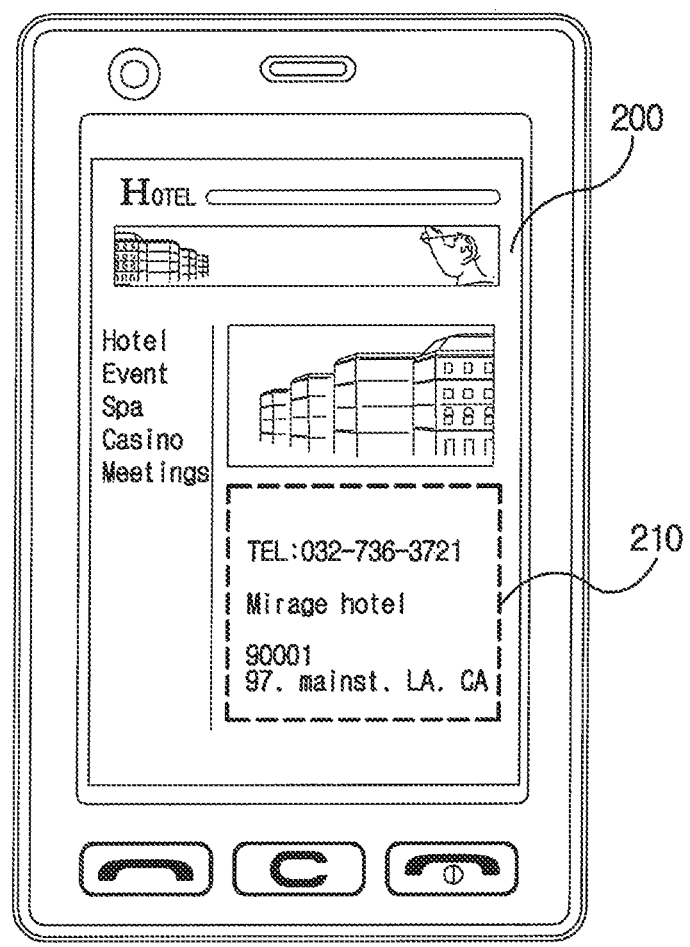
FIGS. 5A, 5B, 5C, 5D and 5E are image diagrams of the first implementation where the method for executing a menu in a mobile terminal according to the one embodiment of the present disclosure is applied.
Figure 5B:
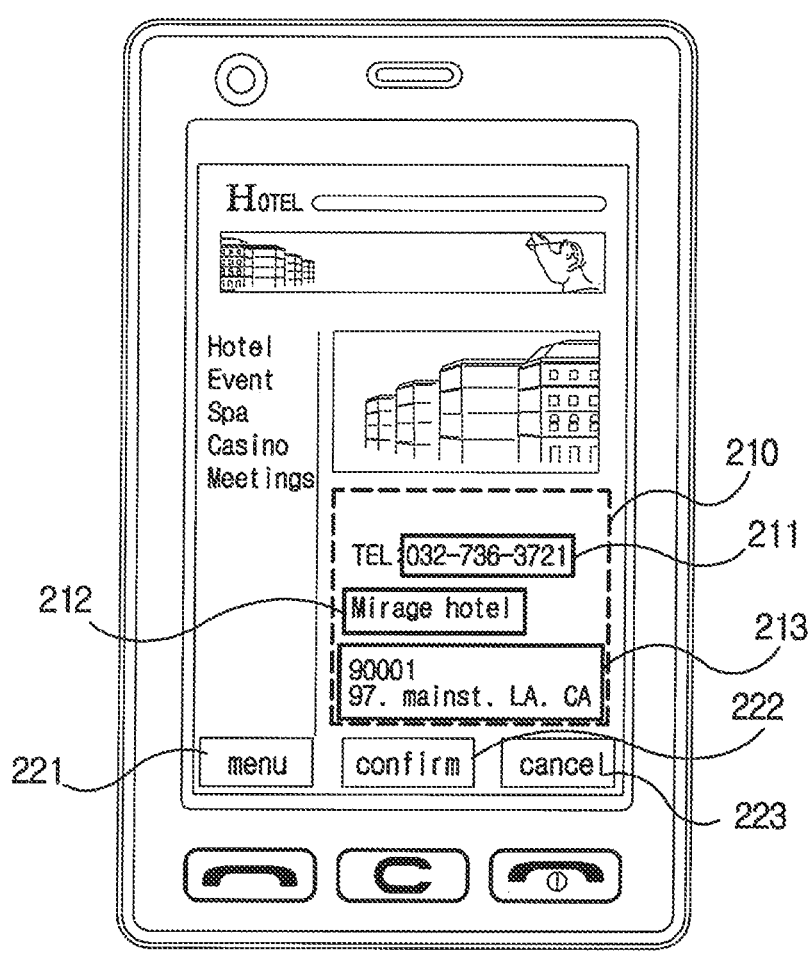
Figure 5C:
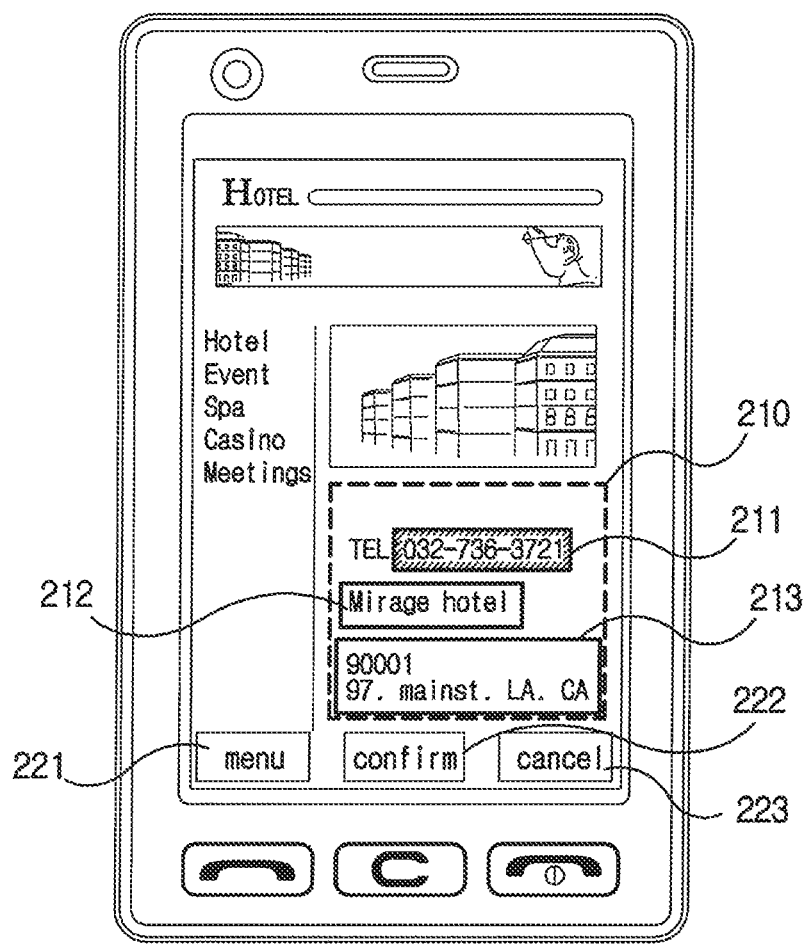
Figure 5D:
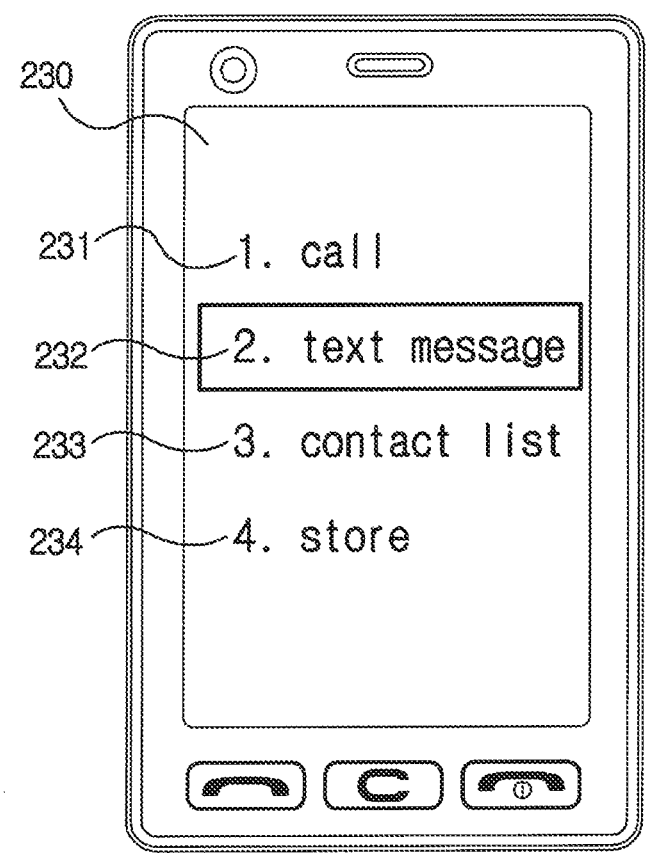
Figure 5E:
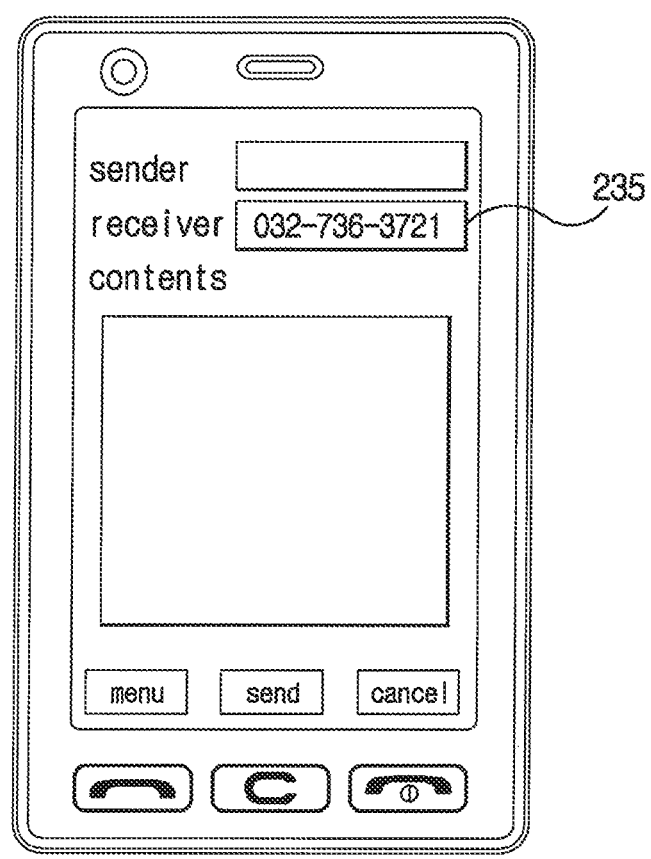

FIG. 5A illustrates a web page screen 200. The controller 180 operates the wireless communication module 110 to access an external server so as to receive a web data. Then, the controller displays the web page screen 200 on the display unit 151. In this state, as shown in FIG. 5B, if some area is selected, the controller analyzes the selected area to search whether a phone number data, a search word data, or an address data exist in the selected area. If the predetermined number of the serial number exists and the dash (-) is between the serial numbers, the controller determines that it is a phone number data. The controller compares the search word data base with the selected area to confirm whether the selected area has a search word. The controller compares the address data base with the selected area to confirm whether the selected area has a postal code, or an address name which are stored in the address data base. As shown in FIG. 5B, the specific area 210 has a phone number data 211, a search word 212, and an address data 213. Furthermore, the menu icon 221, the confirm icon 222 and the cancel icon 223 may be additionally displayed on the display unit 151. The searched data may be displayed to have a different color so as to inform that the data is searched. On the other hand, a cursor may be positioned on any one of the search data. Or, a cursor block may be positioned on any one of the search data. In a state that the cursor is positioned on the phone number data, if the confirm icon 222 is selected, the phone number data is selected and the controller 180 controls the display unit 151 so that the selected phone number data 211 can be distinctly displayed from other data, referring to FIG. 5C. Namely, the color of the phone number data may be changed or the color of the other data may be changed. In this state, if the menu icon 221 is selected, as shown in FIG. 5D, a phone number related menu 230 is displayed. This phone number related menu is a menu which uses the phone number in executing the menu. The phone number related menu may include a call icon 231, a text message icon 232, a contact list icon 233, and a store icon 234. If the call icon 231 is selected, the controller 180 transmits a call signal to the selected phone number. Moreover, if the contact list icon 233 is selected, the contact list storing screen is displayed on the display unit 151 and, the selected phone number is automatically inputted to the phone number input block of the contact list storing screen (not shown in figure). On the other hand, if the text message icon 232 is selected, as shown in FIG. 5E, the phone number is automatically inputted to the receiver block of the text message draft screen.

Moreover, if the phone number data has a blue color, the phone number related menu may have the same color so that the user may easily recognize what the selected menu is.

According to the first implementation of the present disclosure, the user may use the phone number data in the web page to easily execute the application that he wants.

[Second Implementation]

FIGS. 6A, 6B, 6C, 6D and 6E are image diagrams of the second implementation where the method for executing a menu in a mobile terminal according to the one embodiment of the present disclosure is applied.

Figure 6A:
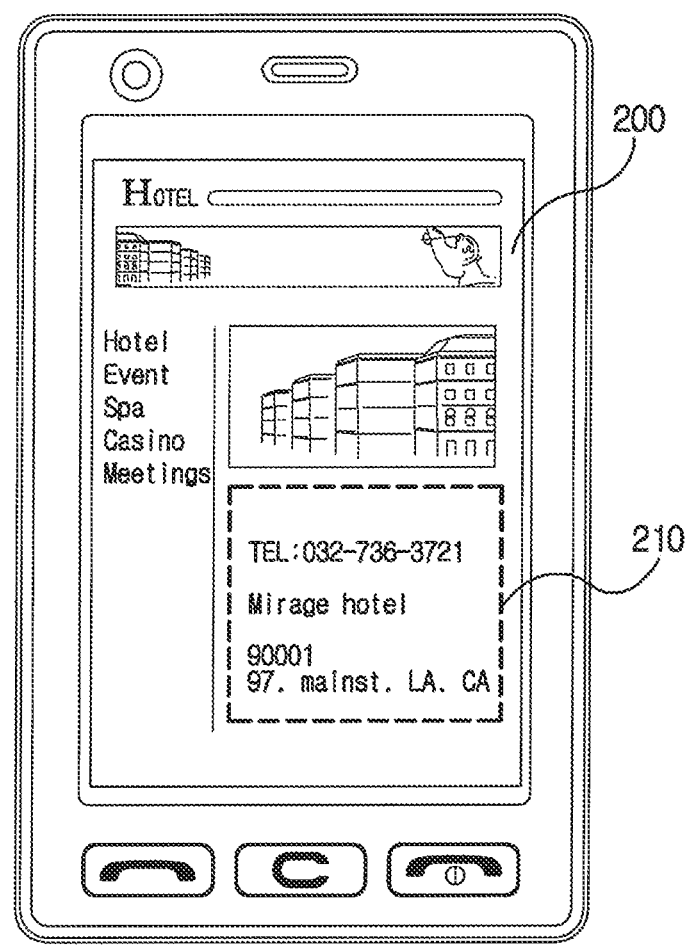
FIGS. 6A, 6B, 6C, 6D, and 6E are image diagrams of the second implementation where the method for executing a menu in a mobile terminal according to the one embodiment of the present disclosure is applied.
Figure 6B:
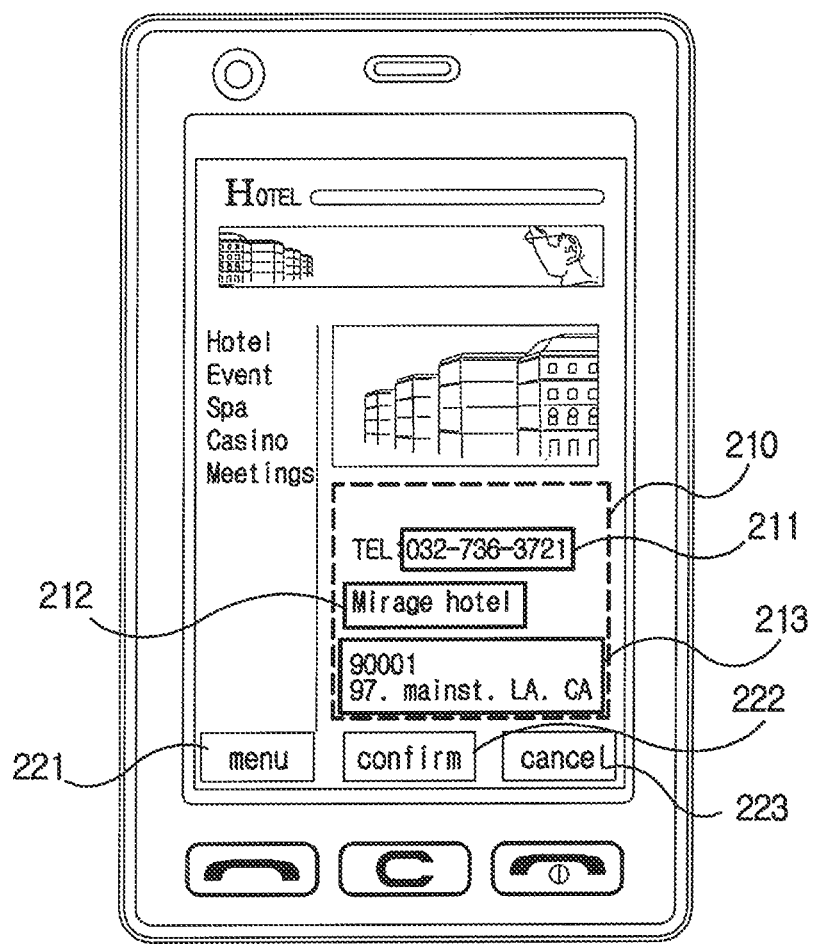
Figure 6C:
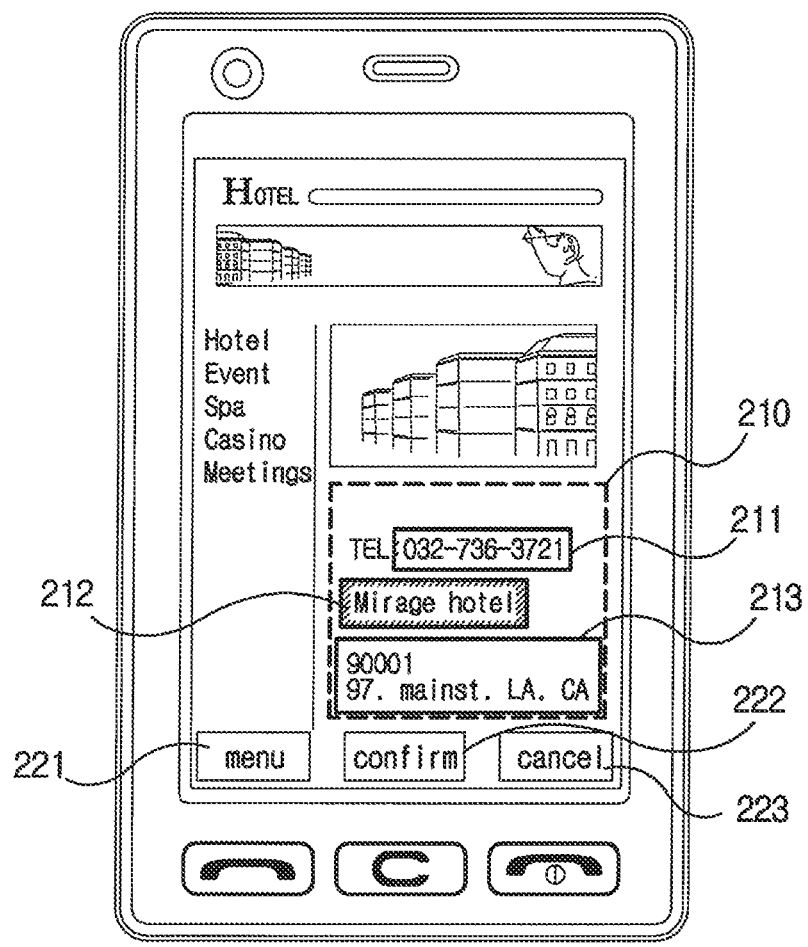

FIG. 6A illustrates a web page screen 200. The controller 180 operates the wireless communication module 110 to access an external server so as to receive a web data. Then, the controller displays the web page screen 200 on the display unit 151. In this state, as shown in FIG. 6B, if some area is selected, the controller analyzes the selected area to search whether a phone number data, a search word data, or an address data exist in the selected area. As shown in FIG. 6B, the specific area 210 has a phone number data 211, a search word 212, and an address data 213. Furthermore, the menu icon 221, the confirm icon 222 and the cancel icon 223 may be additionally displayed on the display unit 151.

Figure 6D:
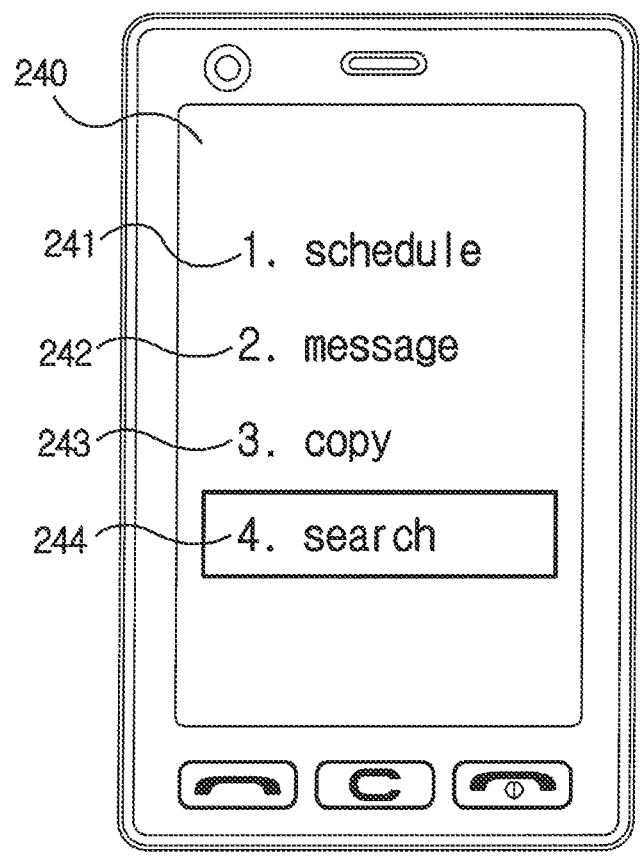
Figure 6E:

The searched data may be displayed to have a different color so as to inform that the data is searched. On the other hand, a cursor may be positioned on any one of the searched data. In a state that the cursor is positioned on the search word data 212, if the confirm icon 222 is selected, the selected search word 212 can be distinctly displayed from other data, referring to FIG. 6C. In this state, if the menu icon 221 is selected, as shown in FIG. 6D, a search word related menu 230 is displayed. This search word related menu is a menu which uses the search word in executing the menu. The search word related menu may include a schedule icon 241, a message icon 242, a copy icon 243, and a search icon 244. If the schedule icon 241 is selected, the controller 180 stores the selected search word in the schedule menu. Moreover, if the message icon 242 is selected, the controller 180 displays the message draft screen on the display unit 151. At this time, the selected search word is automatically inputted on the contents block of the message draft screen (not shown in figure). If the copy icon 243 is selected, the selected search word is temporally stored. Then, if the 'paste' function is executed, the copied search word is inputted. On the other hand, if the search icon 244 is selected, as shown in FIG. 6E, the controller operates the wireless communication module 110 to display the predetermined web page 250 on the display unit 151. At this time, the search word data 212 is automatically displayed on the search word block 251.

Moreover, if the search word data has a yellow color, the search word related menu may have the same color so that the user may easily recognize what the selected menu is.

According to the second implementation of the present disclosure, the user may use the search word data in the web page to easily execute the related application that he wants.

[Third Implementation]

FIGS. 7A, 7B, 7C, 7D and 7E are image diagrams of the third implementation where the method for executing a menu in a mobile terminal according to the one embodiment of the present disclosure is applied.

Figure 7A:
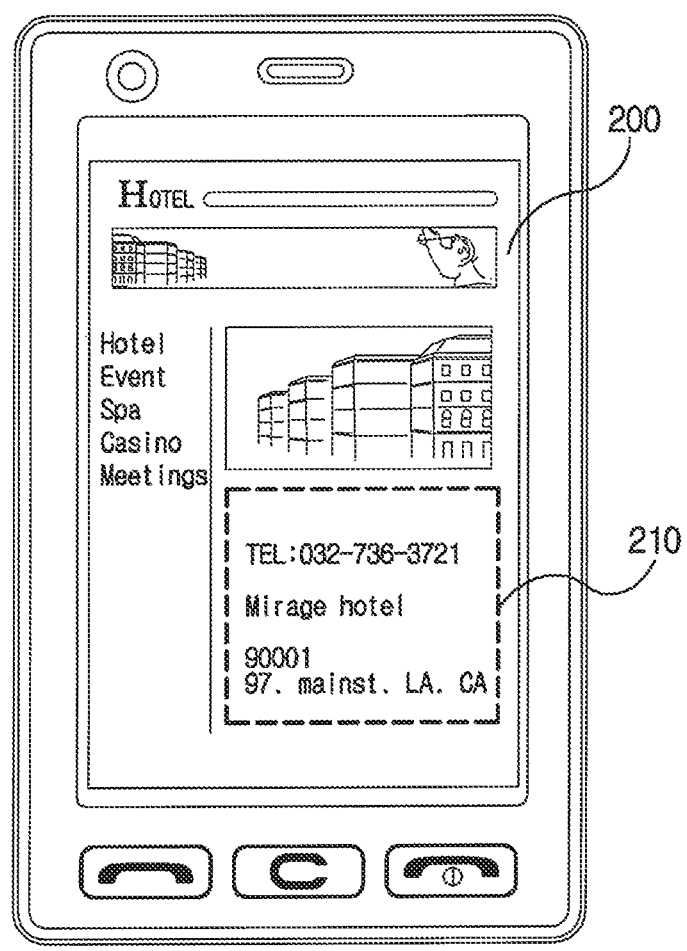
FIGS. 7A, 7B, 7C, 7D and 7E are image diagrams of the third implementation where the method for executing a menu in a mobile terminal according to the one embodiment of the present disclosure is applied.
Figure 7B:
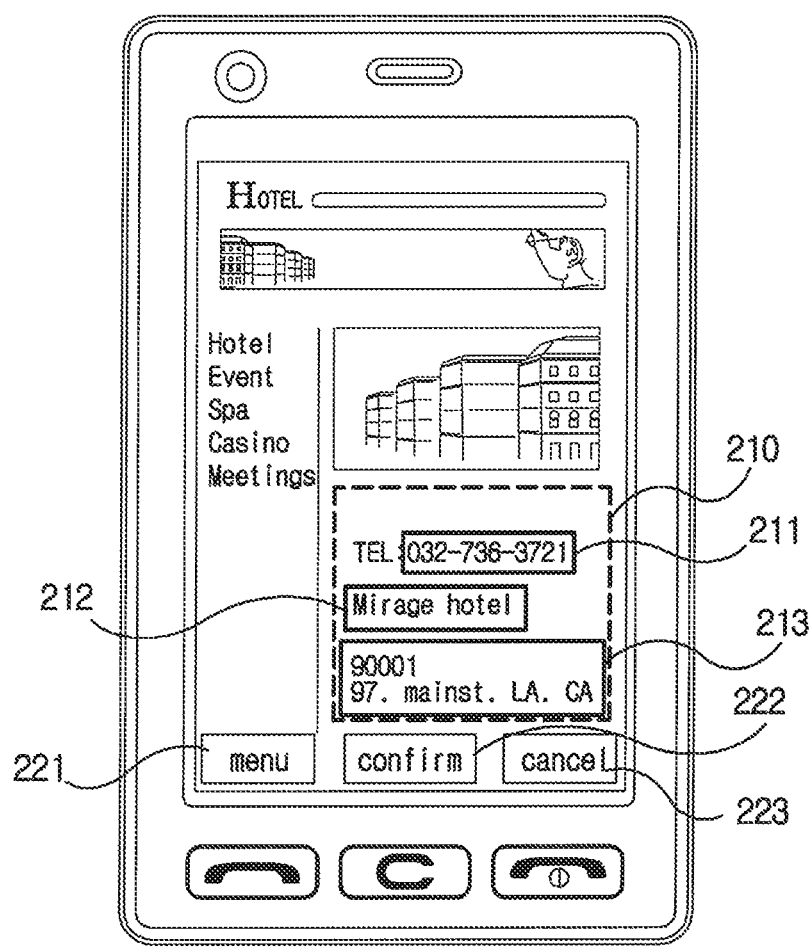
Figure 7C:
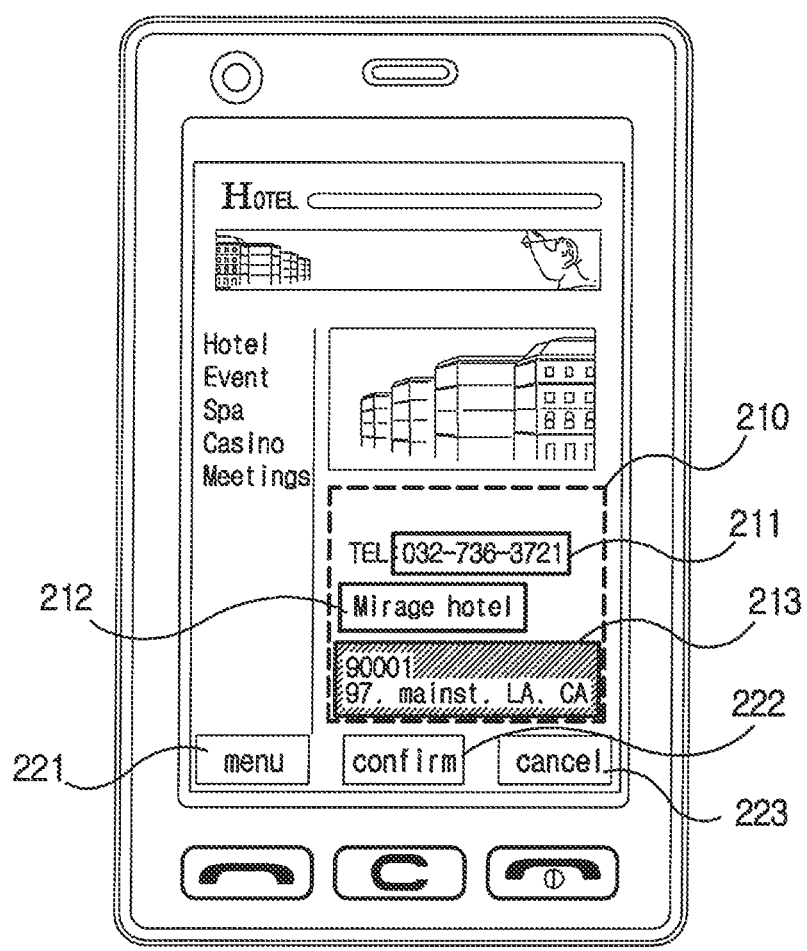

FIG. 7A illustrates a web page screen 200. The controller 180 operates the wireless communication module 110 to access an external server so as to receive a web data. Then, the controller displays the web page screen 200 on the display unit 151. In this state, as shown in FIG. 7B, if some area is selected, the controller analyzes the selected area to search whether a phone number data, a search word data, or an address data exist in the selected area. As shown in FIG. 7B, the specific area 210 has a phone number data 211, a search word 212, and an address data 213. Furthermore, the menu icon 221, the confirm icon 222 and the cancel icon 223 may be additionally displayed on the display unit 151.

Figure 7D:
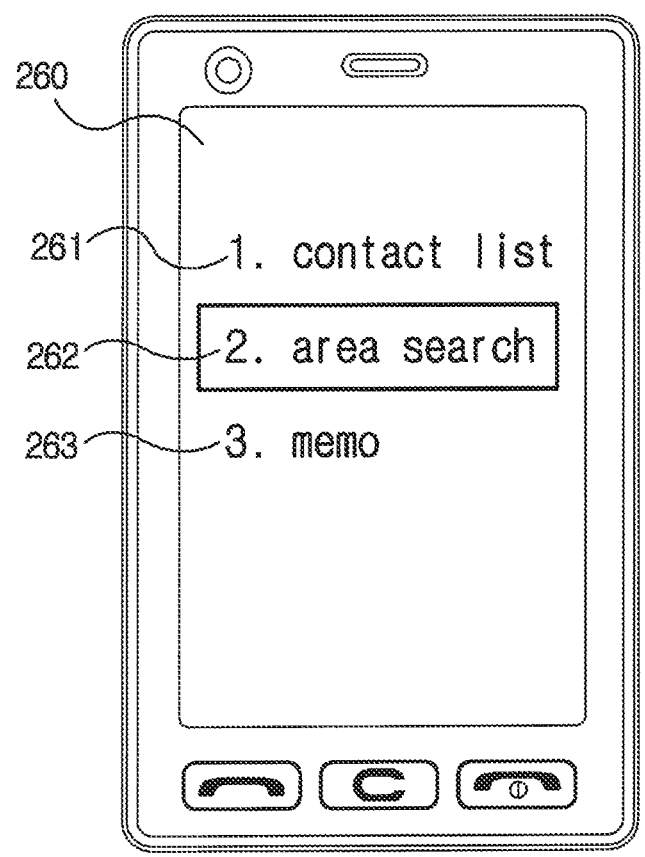
Figure 7E:
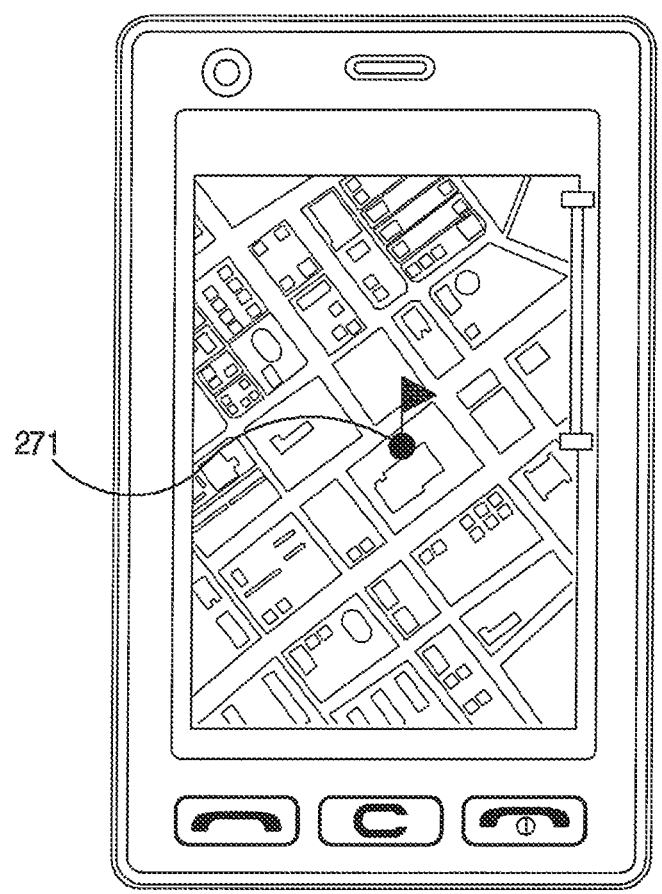

The searched data may be displayed to have a different color so as to inform that the data is searched. On the other hand, a cursor may be positioned on any one of the searched data. In a state that the cursor is positioned on the address data 213, if the confirm icon 222 is selected, the selected address data 213 can be distinctly displayed from other data, referring to FIG. 7C. In this state, if the menu icon 221 is selected, as shown in FIG. 7D, an address data related menu 260 is displayed. This address data related menu is a menu which uses the address data in executing the menu. The address data related menu may include a contact list icon 261, an area search icon 262, and a memo icon 263. If the contact list icon 261 is selected, the controller 180 displays the contact list draft screen on the display unit 151. At this time, the address data is automatically inputted on the address block. Moreover, if an area search icon 262 is selected, the controller 180 operates the GPS module 115 to display the map data on the display unit 151, referring to FIG. 7E. Moreover, the position of the address may be displayed with a specific icon 271 on the display unit 151. On the other hand, if the memo icon 263 is selected, the controller Moreover, if the address data has a red color, the address related menu may have the same color so that the user may easily recognize what the selected menu is.

According to the third implementation of the present disclosure, the user may use the address data in the web page to easily execute the related application that he wants.

[Fourth Implementation]

FIGS. 8A, 8B, 8C and 8D are image diagrams of the fourth implementation where the method for executing a menu in a mobile terminal according to the one embodiment of the present disclosure is applied.

Figure 8A:
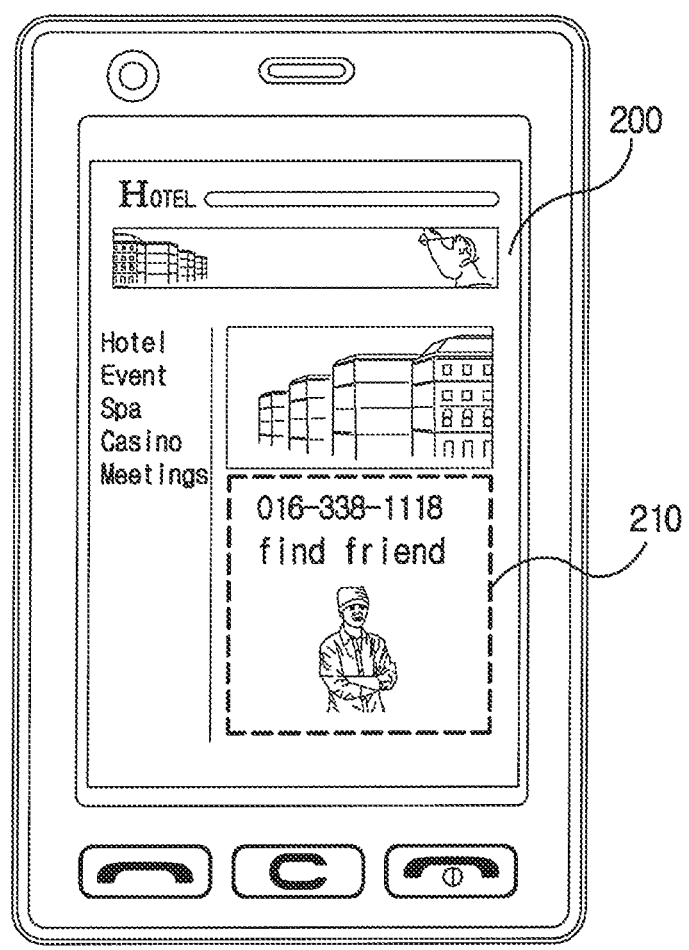
FIGS. 8A, 8B, 8C, and 8D are image diagrams of the fourth implementation where the method for executing a menu in a mobile terminal according to the one embodiment of the present disclosure is applied.

FIG. 8A illustrates a web page screen 200. The controller 180 operates the wireless communication module 110 to access an external server so as to receive a web data. Then, the controller displays the web page screen 200 on the display unit 151. In this state, as shown in FIG. 8B, if the specific area 210 is selected, the controller analyzes the selected area to place the cursor on the phone number data 311, at first.

Figure 8B:
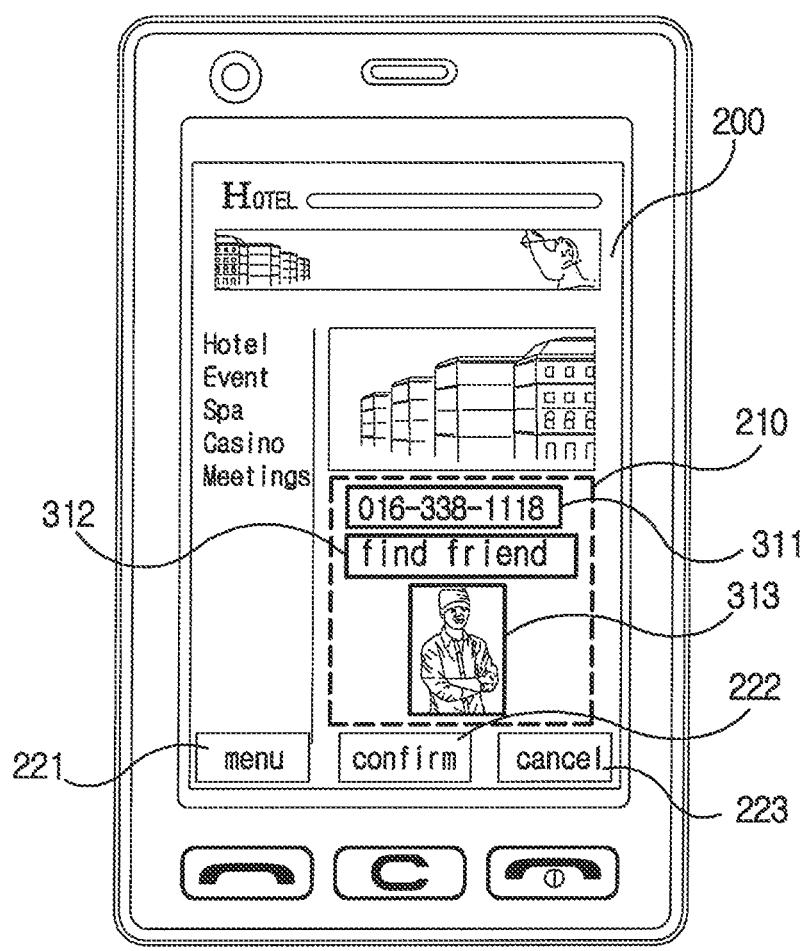

The specific area may include a phone number data 311, a contents data 312, and an image data 313, as shown in FIG. 8B. The each data may have its own color. In this state, if the menu key is selected, a simultaneous use icon 321 and an individual use icon 322 may be displayed on the display unit 151, referring to FIG. 8C. The simultaneous use icon may be used in executing an application with using the all selected area data. If the individual use icon is selected, as shown in FIG. 5 to FIG. 7, the characteristic of the automatically selected data may be used to set up the menu. Then, the selected data may be used in executing the application.

In FIG. 8, the process that the both-use icon is selected will be described.

Figure 8C:
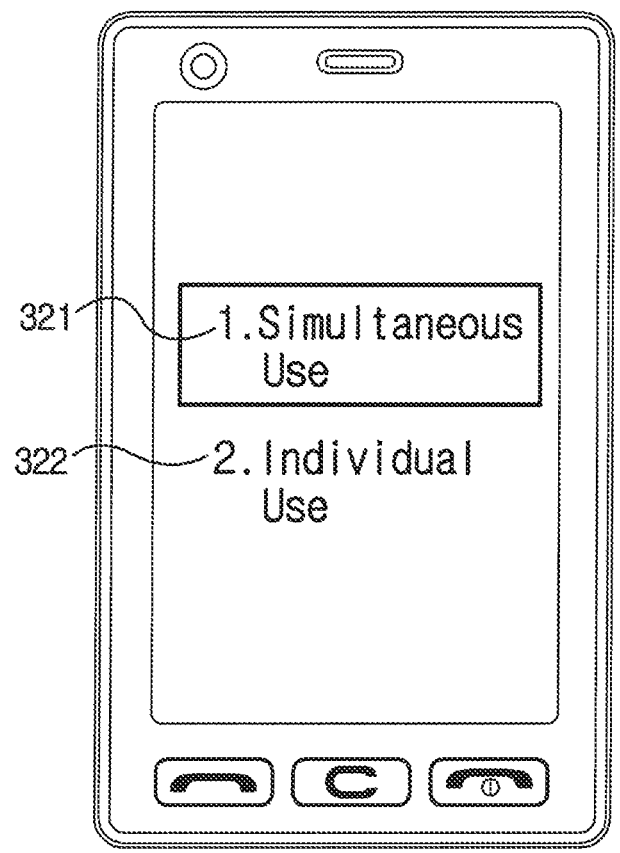
Figure 8D:
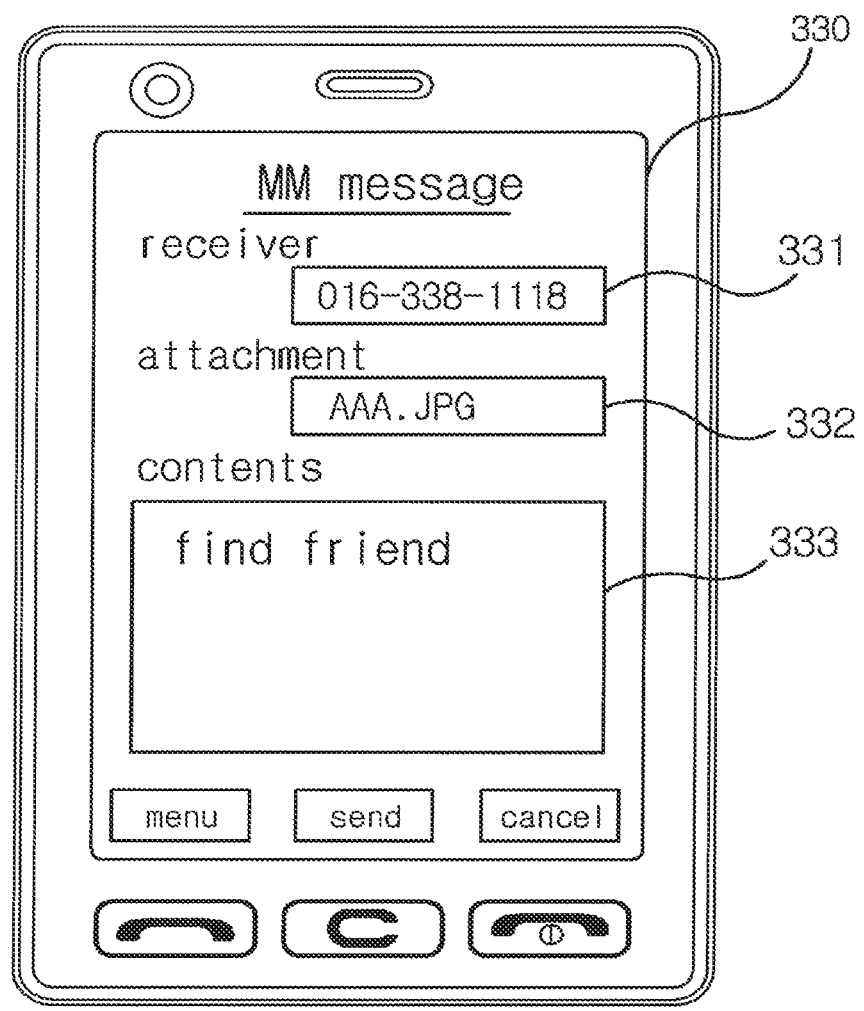

As shown in FIG. 8C, if the simultaneous use icon 322 is selected, the menu which uses 3 kinds data 311, 312, 313 is automatically set up. Namely, in this case, the multimedia message draft screen 330 is automatically selected to be displayed on the display unit 151. The multimedia message draft screen 330 includes a receiver block 331, an attach file block 332, and a contents block 333, as shown in FIG. 8D.

The phone number data 311 is automatically inputted on the receiver block 331. The image data 313 is automatically inputted on the attach file block 332. The contents data 312 is automatically inputted on the contents block 333.

If the image data does not exist, the text message draft screen may be displayed on the display unit 151. The phone number data is automatically inputted on the receiver block and the contents data is automatically inputted on the contents block. If the contents data is used in SMS message and the quantity of the contents data is more than the quantity which the SMS can send one time, the plurality of the SMS messages may be sent by dividing the contents data. At this time, the number of SMS messages may be previously displayed on the display unit.

According to the third implementation of the present disclosure, the user may use the web page to easily draft the multimedia message or the SMS message.

In the previous description, the web page is used in selecting the data. However, the present disclosure may apply the e-book data, the image data, or text data and so on.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touch screen configured to receive a touch input; and
a controller configured to cause the touch screen to:
display a page including a plurality of data comprising at least a number data or an address data, the number data determined by the controller as a phone number based on predetermined criteria and the address data determined by the controller as an address based on predetermined criteria;
display a key in response to a first input for selecting a portion of the displayed page received via the touch screen, the first input received while the page is displayed, the selected portion of the page including at least the number data or the address data, and the key additionally displayed on the touch screen on which the page is displayed; and
display a plurality of icons related to at least one of the number data or the address data in response to a second input received via the key,
wherein icons related to the number data include at least an icon for executing a call function, an icon for executing a text message function, or an icon for executing a contact list function,
wherein icons related to the address data include at least an icon for executing an area search function, and
wherein the number data is displayed to have a different color compared to other data among the plurality of data when the number data has been searched from the page, and wherein the address data is displayed to have a different color compared to other data among the plurality of data when the address data has been searched from the page.

2. The mobile terminal of claim 1, wherein the page displayed on the touch screen comprises at least one of e-book data, image data, text data, or web page data.

3. The mobile terminal of claim 1, wherein the selected portion of the page is:
an area selected by two points on the touch screen that are touched by a user within a predetermined time such that the touched two points become two corners of the selected area; or
an area selected by a drag and drop gesture on the touch screen.

4. The mobile terminal of claim 1, wherein the controller is further configured to cause the touch screen to display a call screen in response to selection of the icon for executing the call function, wherein the number data is automatically input as a phone number into a receiver block of the call screen.

5. The mobile terminal of claim 1, wherein the controller is further configured to cause the touch screen to display a text message draft screen in response to selection of the icon for executing the text message function, wherein the number data is automatically input as a phone number into a receiver block of the text message draft screen.

6. The mobile terminal of claim 1, wherein in response to selection of the icon for executing the contact list function, the controller is configured to:
cause the touch screen to display a contact list storing screen;
cause the number data to be automatically input as a phone number into a phone number input block of the contact list storing screen; and
cause a memory to store the phone number displayed in the phone number input block.

7. The mobile terminal of claim 1, wherein the controller is further configured to cause the touch screen to display a contact list draft screen in response to selection of the icon for executing the contact list function, wherein the address data is automatically input as an address into an address block of the contact list draft screen.

8. The mobile terminal of claim 1, wherein the controller is further configured to cause the touch screen to display a map image in response to selection of the icon for executing the area search function, wherein the address data is automatically indicated by a specific icon on the map image.

9. The mobile terminal of claim 1, wherein the controller is further configured to cause the touch screen to display both the icons related to the number data and the icons related to the address data together.

10. The mobile terminal of claim 1, wherein the controller is further configured to cause the touch screen to:
 display the key while the page is displayed; and
 not display the page when the plurality of icons are displayed,
 wherein the second input is received while both the page and the key are displayed together on the touch screen.

11. A method for controlling a mobile terminal, the method comprising:
 displaying, on a touch screen, a page including a plurality of data comprising at least a number data or an address data, the number data determined as a phone number based on predetermined criteria and the address data determined as an address based on predetermined criteria;
 displaying, on the touch screen, a key in response to a first input for selecting a portion of the displayed page received via the touch screen, the first input received while the page is displayed, the selected portion of the page including at least the number data or the address data, and the key additionally displayed on the touch screen on which the page is displayed; and
 displaying, on the touch screen, a plurality of icons related to at least one of the number data or the address data in response to a second input received via the key,
 wherein icons related to the number data include at least an icon for executing a call function, an icon for executing a text message function, or an icon for executing a contact list function,
 wherein icons related to the address data include at least an icon for executing an area search function, and
 wherein the number data is displayed to have a different color compared to other data among the plurality of data when the number data has been searched from the page, and wherein the address data is displayed to have a different color compared to other data among the plurality of data when the address data has been searched from the page.

12. The method of claim 11, wherein the page displayed on the touch screen comprises at least one of e-book data, image data, text data, or web page data.

13. The method of claim 11, wherein the selected portion of the page is:
 an area selected by two points on the touch screen that are touched by a user within a predetermined time such that the touched two points become two corners of the selected area; or
 an area selected by a drag and drop gesture on the touch screen.

14. The method of claim 11, further comprising displaying, on the touch screen, a call screen in response to selection of the icon for executing the call function, wherein the number data is automatically input as a phone number into a receiver block of the call screen.

15. The method of claim 11, comprising displaying, on the touch screen, a text message draft screen in response to selection of the icon for executing the text message function, wherein the number data is automatically input as a phone number into a receiver block of the text message draft screen.

16. The method of claim 11, further comprising in response to selection of the icon for executing the contact list function:
 displaying, on the touch screen, a contact list storing screen;
 causing the number data to be automatically input as a phone number into a phone number input block of the contact list storing screen; and
 storing, in a memory, the phone number displayed in the phone number input block.

17. The method of claim 11, further comprising displaying, on the touch screen, a contact list draft screen in response to selection of the icon for executing the contact list function, wherein the address data is automatically input as an address into an address block of the contact list draft screen.

18. The method of claim 11, further comprising displaying, on the touch screen, a map image in response to selection of the icon for executing the area search function, wherein the address data is automatically indicated by a specific icon on the map image.

19. The method of claim 11, wherein both the icons related to the number data and the icons related to the address data are displayed together.

20. The method of claim 11, further comprising:
 displaying the key while the page is displayed; and
 not displaying the page when the plurality of icons are displayed,
 wherein the second input is received while both the page and the key are displayed together on the touch screen.

* * * * *